United States Patent
Bae

(10) Patent No.: US 6,201,776 B1
(45) Date of Patent: Mar. 13, 2001

(54) APPARATUS FOR REPRODUCING PROGRAM DATA RECORDED ON AN OPTICAL DISC AT A MULTIPLE VELOCITY

(75) Inventor: Hong-Moon Bae, Seoul (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/199,555

(22) Filed: Nov. 25, 1998

(30) Foreign Application Priority Data

Nov. 25, 1997 (KR) .............................................. P 97-62608

(51) Int. Cl.$^7$ ....................................................... G11B 7/00
(52) U.S. Cl. ................................................. 369/50; 369/54
(58) Field of Search ................................. 369/50, 54, 59, 369/58, 32

(56) References Cited

U.S. PATENT DOCUMENTS 5,956,307 * 9/1999 Koudo et al. ........................... 369/50

* cited by examiner

Primary Examiner—Nabil Hindi
(74) Attorney, Agent, or Firm—Pillsbury Winthrop LLP

(57) ABSTRACT

An apparatus for reproducing program data recorded on an optical disc at a multiple velocity without a deterioration of a screen quality is disclosed. Storing section stores data which relates to rotation and reproduction velocity for normal and multiple velocity reproductions of the optical disc. Maincontroller checks whether or not a reproduction mode signal indicates the multiple velocity reproduction, and outputs rotation and reproduction velocity data signals corresponding to the checked reproduction mode signal. Velocity controller outputs rotation and reproduction velocity control signals and a memory control signal corresponding to the checked reproduction mode signal based on the rotation and reproduction velocity data signals. Rotating section rotates the optical disc at a rotation velocity determined by a present reproduction velocity signal and the rotation velocity control signal. Reproducing section reproduces the program data at a reproduction velocity determined by the reproduction velocity control signal and provides the present reproduction velocity signal to the rotating section. Memory stores the program data from the reproducing section and output the stored program data in response to the memory control signal. The rotation velocity of the optical disc and the reproduction velocity of the program data are variably controlled. The reproduced program data is stored in the memory and the stored program data is sequentially outputted. Consequently, the apparatus can prevent the deterioration of the screen quality caused by reproducing the program data recorded on the optical disc at the multiple velocity.

6 Claims, 3 Drawing Sheets

APPARATUS FOR REPRODUCING PROGRAM DATA RECORDED ON AN OPTICAL DISC AT A MULTIPLE VELOCITY

BACKGROUND OF THE INVENTION

1. Field of the Invention

The present invention relates to an optical disc player, and more particularly, to an apparatus for reproducing program data recorded on an optical disc at a multiple velocity, which is capable of preventing deterioration of a screen quality even though a user reproduces the program data at the multiple velocity which is faster than a normal reproduction velocity.

2. Description of the Prior Art

In general, optical discs can be divided into discs for exclusive use of reproduction, discs for use of an additional record, and discs for use of erasing and rewriting according to functions and uses thereof.

The reasons these kinds of optical disc players are widely used are that they can reproduce signals with far better quality of picture and/or sound and that it is possible for them to randomly access to program data to be reproduced. In addition to these reasons, there is other reason that noise arising from unstable reproduction and modulation does not occur.

Furthermore, unlike a video cassette recorder or a cassette recorder, these optical disc players can directly move an optical pick-up unit toward a target track position in order to reproduce the data which is recorded on the optical disc within a very short time.

FIG. 1 is a view for showing a screen arrangement type of a group of picture (hereinafter, referred to as GOP) conventionally recorded on an optical disc. As shown in FIG. 1, in the program data recorded on the optical disc, I pictures are arranged at regular intervals. The program data such as B pictures and P pictures are arranged between the two I pictures to make one GOP.

FIG. 2 is a block diagram for showing a circuit diagram of an prior apparatus for reproducing program data at multiple velocity.

Referring to FIG. 2, the reproducing apparatus has a key inputting section 10, a control section 20, a reproducing section 30, a spindle motor driving section 40, and a spindle motor 50.

When a user operates a key of key inputting section 10 to generate a reproduction signal, optical disc D is rotated at a constant linear velocity and the program data recorded on optical disc D is reproduced at a normal velocity. At this time, when a reproducing key signal from key inputting section 10 generated by the user's key operation indicates a multiple velocity, control section 20 detects a position of the I picture of the program data reproduced from optical disc D by reproducing section 30.

When the position of the I picture is detected, control section 20 controls reproducing section 30 to read out or skip I pictures following the detected I picture according to the reproducing key signal indicating the multiple velocity. That is, when the reproduction key signal indicating the multiple velocity is a reproduction key signal indicating twice velocity, as shown in FIG. 2, control section 20 controls reproducing section 30 to read out the I pictures by skipping one by two after detecting a first I picture. When the reproduction key signal indicating multiple velocity is a reproduction key signal indicating three times velocity, control section 30 detects only one out of three I pictures after detecting the first I picture.

Accordingly, the program data recorded on optical disc D is possible to be reproduced at the multiple velocity even though optical disc D being rotated by spindle motor driving section 40 and spindle motor 50 rotates at the constant linear velocity.

However, the reproducing apparatus described above causes a loss of the program data because of skipping other I pictures among the respective I pictures for reproducing the program data at multiple velocity. Consequently, a screen quality of the program data reproduced from reproducing section is deteriorated.

SUMMARY OF THE INVENTION

Therefore, it is an object of the present invention to provide an apparatus for reproducing program data recorded on an optical disc at a multiple velocity, which is capable of preventing deterioration of a screen quality even though a user reproduces the program data recorded on the optical disc at the multiple velocity which is faster than a normal reproduction velocity.

In order to achieve the above object, the present invention provides an apparatus for reproducing data recorded on an optical disc at a multiple velocity, which comprises:

storing means for storing data which relates to a rotation velocity for normal and multiple velocity reproductions of the optical disc and to a reproduction velocity of the program data recorded on said optical disc;

control means for detecting whether or not a reproduction mode signal generated by a user's key operation is either the normal velocity reproduction or the multiple velocity reproduction, for reading out the rotation and the reproduction velocity data corresponding to the detected reproduction mode signal from said storing means to output rotation and reproduction velocity data signals;

clock generating means for generating a reference clock signal;

velocity control means for receiving the reference clock signal and for dividing the reference clock signal based on the rotation and reproduction velocity data signals to output rotation and reproduction velocity control signals and a memory control signal corresponding to the detected reproduction mode signal;

rotating means for receiving a present reproduction velocity signal and for rotating said optical disc at a rotation velocity determined by the present reproduction velocity signal and the rotation velocity control signal;

reproducing means for reproducing the program data recorded on said optical disc at a reproduction velocity determined by the reproduction velocity control signal and for providing said rotating means with the present reproduction velocity signal which represents a presently-reproduced velocity of the program data; and a memory for storing the program data from said reproducing means and for outputting the stored program data in response to the memory control signal.

In the present invention, the velocity control means variably outputs a period of clock pulses of the reference clock signal based on the rotation and the reproduction velocity data.

In the apparatus for reproducing the program data recorded on the optical disc at the multiple velocity according to the present invention, the rotation velocity of optical disc D and the reproduction velocity of the program data recorded on optical disc D are variably controlled in accordance with the user's key operation. Also, the program data reproduced at the multiple velocity is outputted to a display apparatus after the program data is sequentially stored in memory. Accordingly, the loss of the program data which is reproduced from optical disc D does not occurred even though the user selects a mode for reproducing the program data recorded on optical disc D at the multiple velocity.

Therefore, the apparatus can prevent the deterioration of the screen quality caused by reproducing the program data recorded on optical disc D at the multiple velocity.

BRIEF DESCRIPTION OF THE DRAWINGS

The above object and other advantages of the present invention will become more apparent by describing in detail a preferred embodiment thereof with reference to the attached drawings, in which.

DESCRIPTION OF THE PREFERRED EMBODIMENTS

A description will be given below in detail with reference to accompanying drawing to a configuration and an operation of an apparatus for reproducing program data recorded on an optical disc at a multiple velocity according to embodiments of the present invention.

Figure 1:
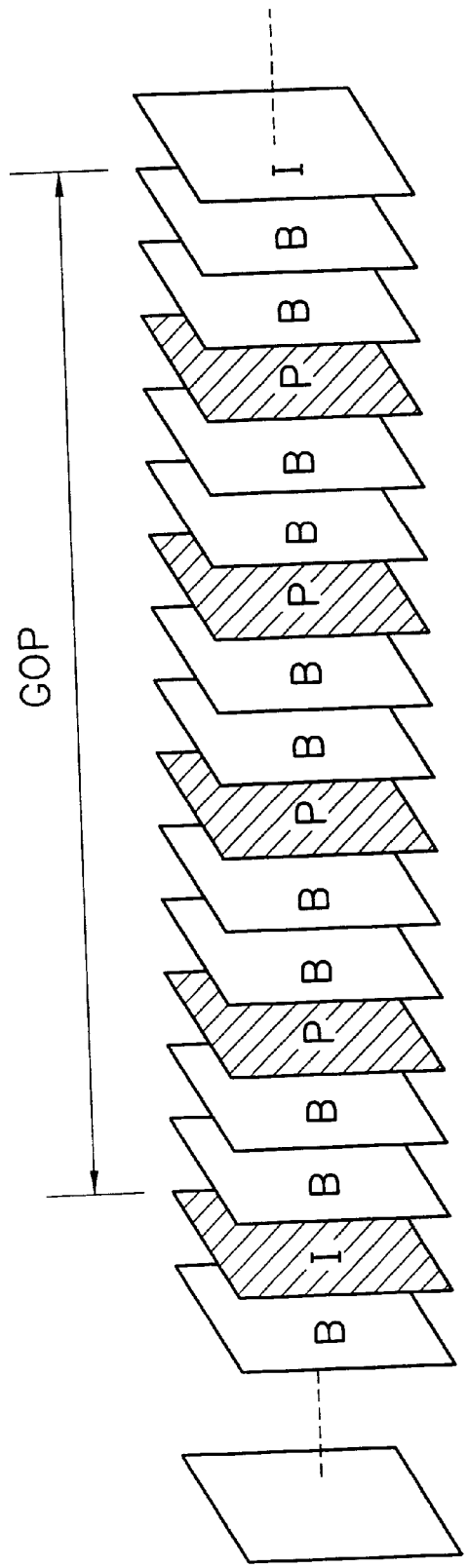
FIG. 1 is a view for showing a screen arrangement type of a GOP conventionally recorded on an optical disc.
Figure 2:
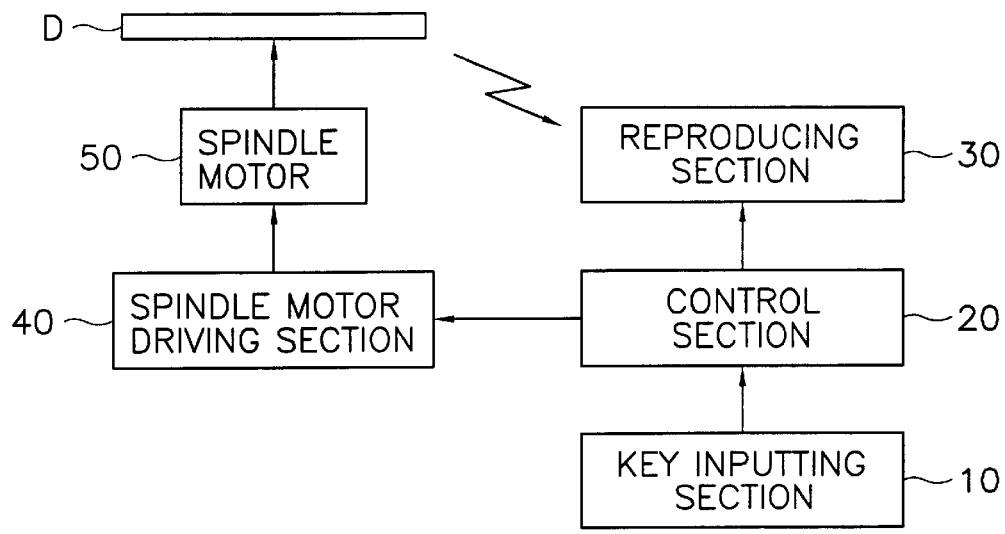
FIG. 2 is a block diagram for showing a circuit configuration of an prior apparatus for reproducing data at a multiple velocity.
Figure 3:
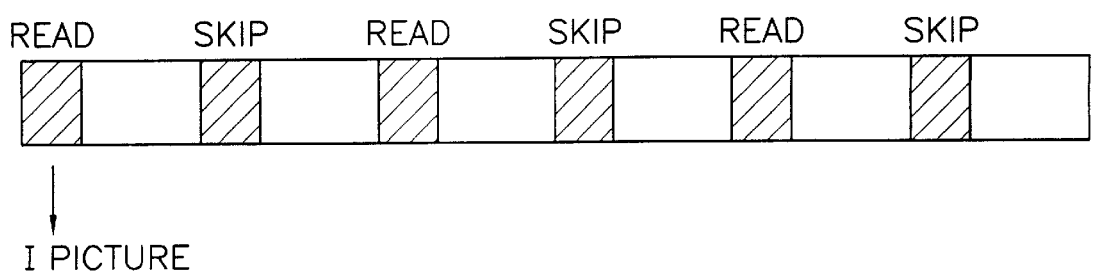
FIG. 3 is a view for showing a reproducing pattern of program data from an optical disc in order to illustrate a reproducing method according to the reproducing apparatus shown in FIG. 2.
Figure 4:
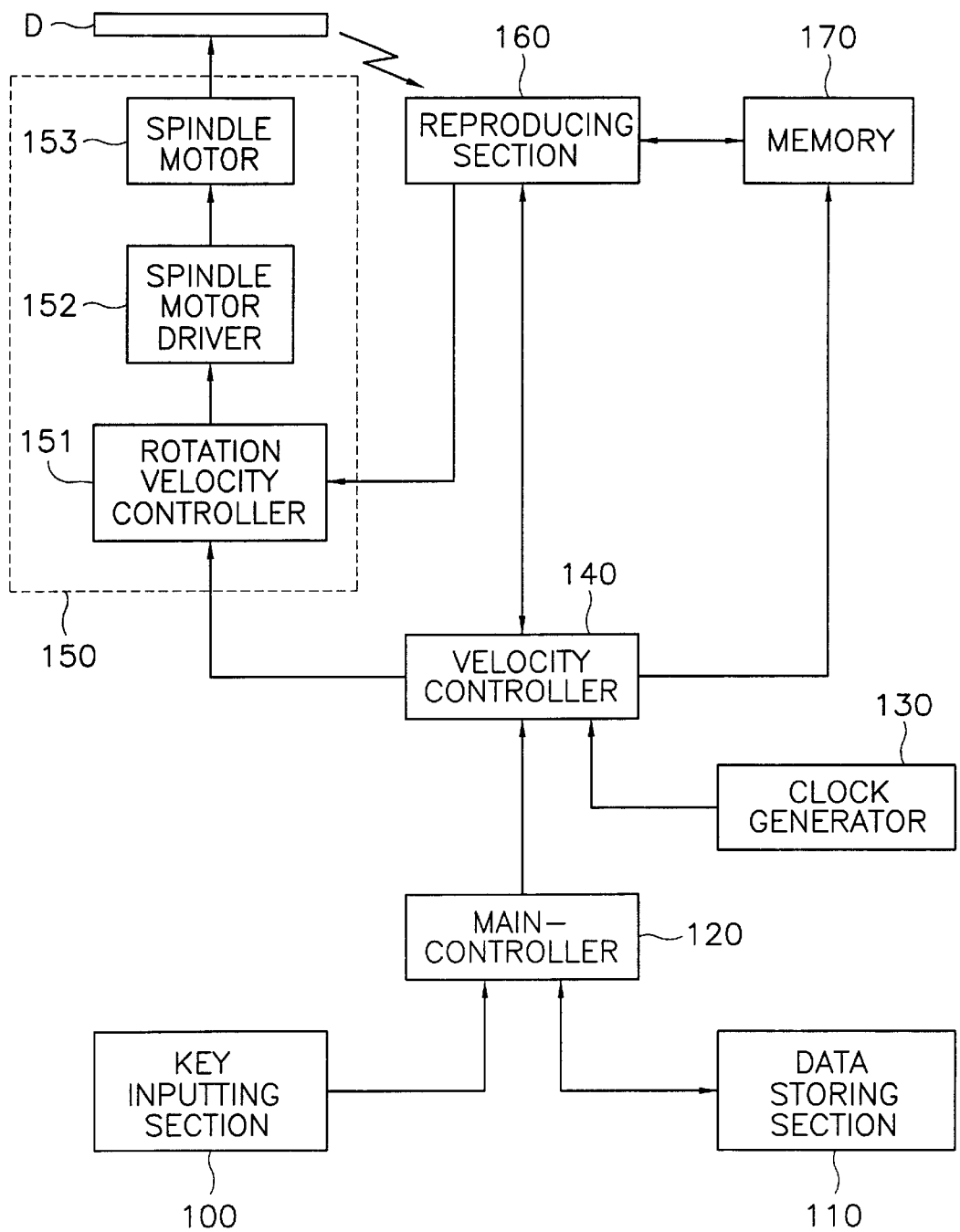
FIG. 4 is a block diagram for showing a circuit configuration of an apparatus for reproducing program data recorded on an optical disc at a multiple velocity according to the one preferred embodiment of the present invention.

FIG. 4 is a block diagram for showing a circuit configuration of an apparatus for reproducing program data recorded on an optical disc at a multiple velocity according to the one preferred embodiment of the present invention.

Referring to FIG. 4, the apparatus for reproducing program data recorded on the optical disc at the multiple velocity according to the present invention has a key inputting section 100 for generating key signals in response to a user's key operation, a storing section 110 for storing rotation and reproduction velocity information of an optical disc D, a maincontroller 120 for controlling an operation of the reproducing apparatus in response to the key signals from key inputting section 100, a clock generator 130 for generating a reference clock signal, a velocity controller 140 for generating control signals in order to a control the rotation and reproduction velocity of optical disc D in response to control of main-controller 120, a rotating section 150 for rotating optical disc D in response to the control of velocity controller 140, a reproducing section 160 for reproducing the program data recorded on optical disc D in response to control of velocity controller 140, and a memory 170 for storing and outputting the program data from reproducing section 160 in response to velocity controller 140.

Key inputting section 100 has keys. Key inputting section 100 provides maincontroller 120 with key signals such as a reproduction signal, a stop signal and a skip signal in response to the user's key operation. At this time, key inputting section 100 has keys for multiple reproduction for reproducing the program data recorded on optical disc D.

Storing section 110 stores the rotation velocity information for rotating optical disc D and the reproduction velocity information for reproducing the program data recorded on optical disc D. At this time, the rotation and reproduction velocity information are detected by an experiment and become an optimized constant linear velocity corresponding to various reproduction velocities provided from the multiple velocity apparatus. Storing section 110 provides the rotation and reproduction velocity information to maincontroller 120 in response to the control of maincontroller 120.

MainController 120 generates control signals for controlling the respective elements of the reproducing apparatus in response to the key signals generated from key inputting section 100 by the user's key operation.

Velocity controller 140 receives the reference clock signal from clock generator 130, and divides the reference clock signal according to the control signal from main-controller 120 to output rotation and reproduction velocity control signals and a memory control signal. At this time, velocity controller 140 consists of a clock divider.

Rotating section 150 has a rotation velocity controller 151, a spindle motor driver 152 and a spindle motor 153. Rotation velocity controller 151 variably outputs a rotation velocity signal for rotating optical disc D according to the rotation velocity control signal from velocity controller 140 and a present reproduction velocity signal applied from reproducing section 160. Spindle motor driver 152 generates a driving signal to spindle motor 153 in response to the rotation velocity signal from rotation velocity controller 151. Spindle motor 153 rotates optical disc D in response to the driving signal.

Reproducing section 160 reproduces the program data recorded on optical disc D in response to the reproduction velocity control signal from velocity controller 140. Also, reproducing section 160 provides the present reproduction velocity signal which represents the presently-reproduced velocity of the program data from optical disc D to rotation velocity controller 151.

Table. 1 described below represents the rotation and reproduction velocity of the optical disc corresponding to the respective multiple velocities when the program data of the optical disc is reproduced at the multiple velocity. A case where the program data recorded on the optical disc is reproduced at a twice velocity is illustrated as an example.

TABLE 1

| step | constant linear velocity | reproduction velocity |
|---|---|---|
| normal reproduction | R1 | P1 |
| twice velocity reproduction | R2 | P2 |
| three times velocity reproduction | R3 | P3 |
| . | . | . |
| . | . | . |
| . | . | . |
| N times velocity reproduction | RN | PN |

When a reproduction signal corresponding to the twice velocity from key inputting section 100 is inputted by the user's key operation, maincontroller 120 reads out rotation velocity information R2 and reproduction velocity information P2 of optical disc D corresponding to the reproduction signal indicating the twice velocity from storing section 110 as shown in Table. 1.

Main-controller 120, based on read-out rotation velocity information R2 and reproduction velocity information P2, applies rotation and reproduction velocity information signals of the twice velocity for reproducing the program data recorded on optical disc D at the twice velocity to velocity controller 140.

Velocity controller 140, based on the rotation and reproduction velocity information signals from maincontroller 120, divides the reference clock signal inputted from clock generator 130 to provide rotation and reproduction velocity control signals corresponding to the twice velocity and a memory control signal corresponding to the twice velocity to rotation velocity controller 151, reproducing section 160, and memory 170, respectively.

Rotation velocity controller 151 outputs the rotation velocity signal indicating the twice velocity in response to the rotation velocity control signal of the twice velocity inputted from velocity controller 140. At this time, the rotation velocity signal indicating the twice velocity is variably outputted according to the present reproduction velocity signal applied from reproducing section 160. That is, when the reproduction velocity of reproducing section 160 is either slower or faster than the rotation velocity of optical disc D, rotation velocity controller 151 variably controls the clock period of the rotation velocity signal according to the reproduction velocity.

Spindle motor driver 152 generates a driving signal indicating the twice velocity to spindle motor 153 in response to the rotation velocity signal indicating the twice velocity from rotation velocity controller 151.

Spindle motor 153 rotates optical disc D at the twice rotation velocity which is faster than a normal rotation velocity in response to the driving signal of the twice velocity from spindle motor driver 152. Accordingly, optical disc D rotates at the twice rotation velocity which is faster than the normal rotation velocity.

Reproducing section 160, responsive to the reproduction velocity control signal indicating the twice velocity from velocity controller 140, reproduces the program data recorded on optical disc D at the twice reproduction velocity which is faster than a normal reproduction velocity.

That is, every I picture included into the program data from optical disc D rotating at the twice velocity is sequentially read out at a velocity which is identical with the rotation velocity by reproducing section 160.

Also, reproducing section 160 sequentially provides memory 170 with the reproduced program data having the I pictures in order to process the reproduced program data at the twice velocity without a loss of the program data.

In addition, reproducing section 160 applies the present reproduction velocity signal which represents the presently-reproduced velocity of the program data from optical disc D to rotation velocity controller 151.

Memory 170 sequentially stores the program data inputted from reproducing section 160 and sequentially outputs the stored program data in response to the memory control signal from velocity controller 140. At this time, memory 170 has at least two memory fields. When the program data from reproducing section 160 is stored in a first memory field, memory 170 reads out the program data which is stored in a second memory field and outputs the read out program data according to the control of reproducing section 160 and velocity controller 140.

The reproducing operation described above is identically executed when the user reproduces the program data recorded on optical disc D at a constant linear velocity, three times velocity, or four times velocity. That is, when the reproduction signal generated by the user's key operation is a reproduction signal corresponding to N times velocity, velocity controller 140 outputs rotation and reproduction velocity control signals indicating the N times velocity.

In the apparatus for reproducing program data recorded on the optical disc at the multiple velocity according to the present invention, the rotation velocity of optical disc D and the reproduction velocity of the program data recorded on optical disc D are variably controlled in accordance with the user's key operation. Also, the program data reproduced at the multiple velocity is outputted to a display apparatus after the program data is sequentially stored in the memory. Accordingly, the loss of the program data which is reproduced from optical disc D does not occur even though the user selects a mode for reproducing the program data recorded on optical disc D at the multiple velocity. Therefore, the apparatus can prevent the deterioration of the screen quality caused by reproducing the program data recorded on optical disc D at the multiple velocity.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. An apparatus for reproducing program data recorded on an optical disc at a multiple velocity, said apparatus comprising:

storing means for storing data which relates to a rotation velocity for normal and multiple velocity reproductions of the optical disc and to a reproduction velocity of the program data recorded on said optical disc;

control means for detecting whether or not a reproduction mode signal generated by a user's key operation is either the normal velocity reproduction or the multiple velocity reproduction, for reading out the rotation and the reproduction velocity data corresponding to the detected reproduction mode signal from said storing means to output rotation and reproduction velocity data signals;

clock generating means for generating a reference clock signal;

velocity control means for receiving the reference clock signal and for dividing the reference clock signal based on the rotation and reproduction velocity data signals to output rotation and reproduction velocity control signals and a memory control signal corresponding to the detected reproduction mode signal;

rotating means for receiving a present reproduction velocity signal and for rotating said optical disc at a rotation velocity determined by the present reproduction velocity signal and the rotation velocity control signal;

reproducing means for reproducing the program data recorded on said optical disc at a reproduction velocity determined by the reproduction velocity control signal and for providing said rotating means with the present reproduction velocity signal which represents a presently-reproduced velocity of the program data; and a memory for storing the program data from said reproducing means and for outputting the stored program data in response to the memory control signal.

2. The apparatus as claimed in claim 1, wherein said velocity control means variably outputs a period of clock pulses of the reference clock signal based on the rotation and the reproduction velocity data.

3. The apparatus as claimed in claim 1, wherein said rotating means comprises:

rotation velocity control means for outputting a rotation velocity signal in order to rotate said optical disc at the rotation velocity determined by the present reproduction velocity signal and the rotation velocity control signal and for variably outputting the rotation velocity signal based on the present reproduction velocity signal;

motor driving means for outputting a driving signal corresponding to the rotation velocity signal from said rotation velocity control means; and a motor for rotating said optical disc in response to the driving signal from said motor driving means.

4. The apparatus as claimed in claim 1, wherein said velocity control means outputs the memory control signal when the program data is reproduced at the multiple velocity.

5. The apparatus as claimed in claim 1, wherein said memory includes two memory fields at least.

6. The apparatus as claimed in claim 5, wherein said at least two respective memory fields execute alternately storage and output operations of the program data from said reproducing means.

* * * * *